United States Patent [19]
Roberts et al.

[11] Patent Number: 5,561,338
[45] Date of Patent: Oct. 1, 1996

[54] PACKAGED ARC LAMP AND COOLING ASSEMBLY IN A PLUG-IN MODULE

[75] Inventors: Roy D. Roberts, Newark; John Kiss, San Jose, both of Calif.

[73] Assignee: ILC Technology, Inc., Sunnyvale, Calif.

[21] Appl. No.: 421,386

[22] Filed: Apr. 13, 1995

[51] Int. Cl.[6] ............................... H01J 1/02; F28F 7/00; H05K 7/20
[52] U.S. Cl. .................. 313/46; 313/24; 313/35; 361/688; 361/694; 361/704; 361/707; 165/185; 165/80.3
[58] Field of Search ...................... 361/688, 694, 361/695, 704, 707, 709, 710, 730, 752, 728, 807, 809; 313/46, 35, 24, 45; 362/373, 362; 165/104.33, 185, 80.3

[56] References Cited

U.S. PATENT DOCUMENTS

| | | | |
|---|---|---|---|
| 4,546,420 | 10/1985 | Wheeler | 362/373 |
| 4,633,128 | 12/1986 | Roberts | 313/113 |

*Primary Examiner*—Sandra L. O'Shea
*Assistant Examiner*—John Ning
*Attorney, Agent, or Firm*—Thomas E. Schatzel; Law Offices of Thomas E. Schatzel A Prof. Corp.

[57] ABSTRACT

A drop-in arc lamp assembly comprising an arc lamp with fitted cathode and anode heat sinks each including a thin-wall copper strip that is brazed in pleated folds between inner and outer cylindrical rings to create cooling fins. The drop-in lamp assembly also includes an insulative sleeve in which the arc lamp and heat sinks are disposed and a pair of connection bushings piercing the wall of the sleeve and providing an electrical connection to the arc lamp outside the sleeve. A flush-mount receptacle for the drop-in lamp assembly includes a housing with a fan axially positioned behind the arc lamp and heat sinks when they are in place in the sleeve and dropped-into the housing. A glass epoxy board attached to the housing supports and insulates electrical terminals that contact the bushings to power the arc lamp. The arc lamp includes a copper heat conduction flange that surrounds a front window reduced in diameter from the diameter of the arc lamp. The flange conducts heat generated in the window during operation directly to the cathode heat sink. Both heat sinks are forced-air cooled by the fan.

14 Claims, 3 Drawing Sheets

PACKAGED ARC LAMP AND COOLING ASSEMBLY IN A PLUG-IN MODULE

BACKGROUND OF THE INVENTION

1. Field of the Invention

The invention relates generally to arc lamps and specifically to packaged assemblies of such lamps with heat sinks for plug-in replacement module use in projection applications.

2. Description of the Prior Art

Short arc lamps provide intense point sources of light that allow light collection in reflectors for applications in medical endoscopes, instrumentation and projection. Short arc lamps are used in industrial endoscopes for the inspection of jet engine interiors.

A typical short arc lamp comprises an anode and a cathode positioned along the longitudinal axis of a cylindrical, sealed concave chamber that contains a gas pressurized to several atmospheres. U.S. Pat. No. 4,633,128, issued Dec. 30, 1986, to Roy D. Roberts, the present inventor, and Robert L. Miner, describes such a short arc lamp in which a copper sleeve member is attached to the reflecting wall to conduct heat from the reflecting wall through to the exterior wall and eventually to circulating ambient air.

The lamp illustrated in FIG. 2 of Roberts, et al., can be operated at one kilowatt. At such high power levels, the heat generated is conventionally dispersed with heat sinks. However, prior art heat sinks for in excess of a thousand watts are large and bulky.

Prior art heat sinks typically use aluminum extrusions that limit how thin the fins can be made. Extruding operations dictate fin thicknesses and spacings.

SUMMARY OF THE PRESENT INVENTION

It is therefore an object of the present invention to provide an integrated arc lamp module in a packaged assembly that can be operated at five hundred watts and more.

It is another object of the present invention to provide an arc lamp for use in a packaged assembly that is inexpensive to manufacture.

Briefly, an embodiment of the present invention is a drop-in arc lamp assembly that includes an arc lamp with fitted cathode and anode heat sinks each including a thin-wall copper strip that is brazed in pleated folds between inner and outer cylindrical rings to create cooling fins. The drop-in lamp assembly also includes an insulative sleeve in which the arc lamp and heat sinks are disposed and a pair of connection bushings piercing the wall of the sleeve and providing an electrical connection to the arc lamp outside the sleeve. A flush-mount receptacle for the drop-in lamp assembly includes a housing with a fan axially positioned behind the arc lamp and heat sinks when they are in place in the sleeve and dropped-into the housing. A glass-epoxy board attached to the housing supports and insulates electrical terminals that contact the bushings to power the arc lamp. The arc lamp includes a copper heat conduction flange that surrounds a front window reduced in diameter from the diameter of the arc lamp. The flange conducts heat generated in the window during operation directly to the cathode heat sink. Both heat sinks are forced-air cooled by the fan.

An advantage of the present invention is that a high power arc lamp is provided in a packaged assembly that plugs into a modular receptacle as a unit.

Another advantage of the present invention is that an arc lamp is provided for a packaged assembly that is economical to manufacture.

These and other objects and advantages of the present invention will no doubt become obvious to those of ordinary skill in the art after having read the following detailed description of the preferred embodiment which is illustrated in the various drawing figures.

IN THE DRAWINGS

DETAILED DESCRIPTION OF THE PREFERRED EMBODIMENTS

Figure 1:
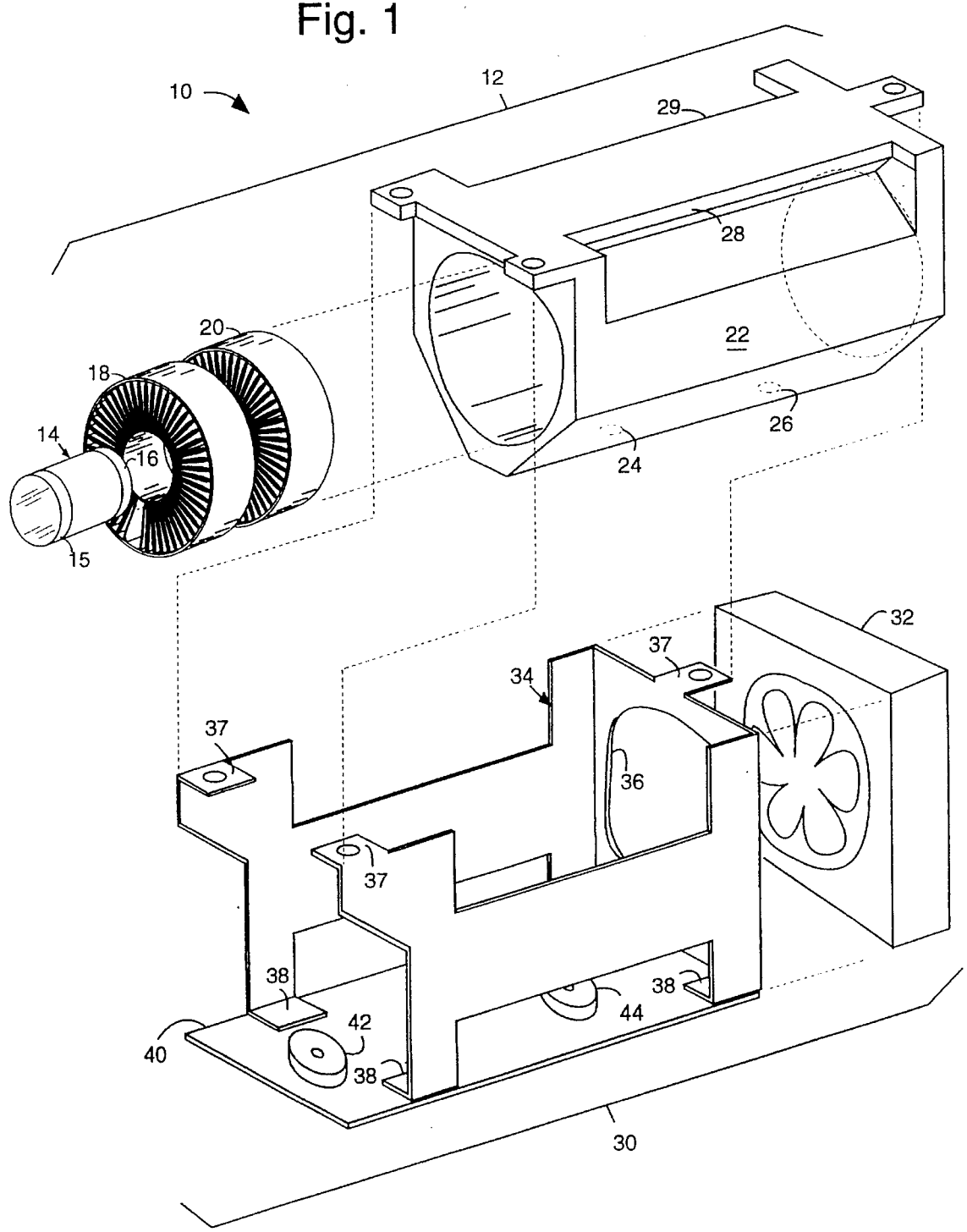
FIG. 1 is an exploded assembly view of a lamp system embodiment of the present invention.

FIG. 1 illustrates a lamp system embodiment of the present invention, referred to herein by the general reference numeral 10. The system 10 comprises a drop-in lamp assembly 12 that includes an arc lamp 14 having an anode ring 16 and a cathode ring 15, a cathode heat sink 18, an anode heat sink 20 and an insulative sleeve 22. The insulative sleeve 22 has a pair of bushings 24 and 26 through which metal fasteners are used to mechanically secure each of the heat sinks 18 and 20 while maintaining their electrical isolation from one another. The arc lamp 14 operates with power levels as high as a thousand watts, so efficient cooling is provided by a snug fit of the arc lamp 14 to the heat sinks 18 and 20. The material used to construct the sleeve 22 is preferably such that it is able to withstand the high temperatures generated by the arc lamp 14 that pass as heat through the heat sinks 18 and 20 during operation and the several thousand volts that can exist between the heat sinks 18 and 20. For example, polyethylene and polypropylene plastic are suitable. The sleeve 22 further includes finger-pull recesses 28 and 29 for a user's ease of withdrawing the drop-in lamp assembly 12 from a drop-in receptacle 30.

The drop-in receptacle 30 includes a fan 32 mounted to the back end of a metal-wall housing 34. The drop-in receptacle 30 is suitable for flush mounting in a flat area. The finger pulls 28 and 29 make it practical to use such flush mountings, given the frequent need to replace short-lived arc lamps 14. The fan 32 operates to blow cool outside air through a hole 36 directly to the radial fins of the heat sinks 18 and 20. In some cases, it is preferable to use two fans 32 mounted in series face-to-back to overcome any airflow resistance that may exist through the heat sinks 18 and 20. The metal-wall housing 34 comprises a plurality of tabs 37 that are used with fasteners to attach the sleeve 22, and a plurality of tabs 38 that are also used with fasteners to attach to a glass epoxy board 40. The glass epoxy board 40 provides mechanical support and insulation for a cathode terminal 42 that electrically engages the cathode heat sink 18 and the cathode ring 15, and an anode terminal 44 that electrically engages the anode heat sink 20 and the anode ring 16. The hole 36 in the housing 34 allows air from the fan 32 to be axially directed from the outside to the heat sinks 20 and 18, respectively. High-voltage direct current power is applied to the system 10 through electrical cables that are permanently wired to the terminals 42 and 44.

Figure 2:
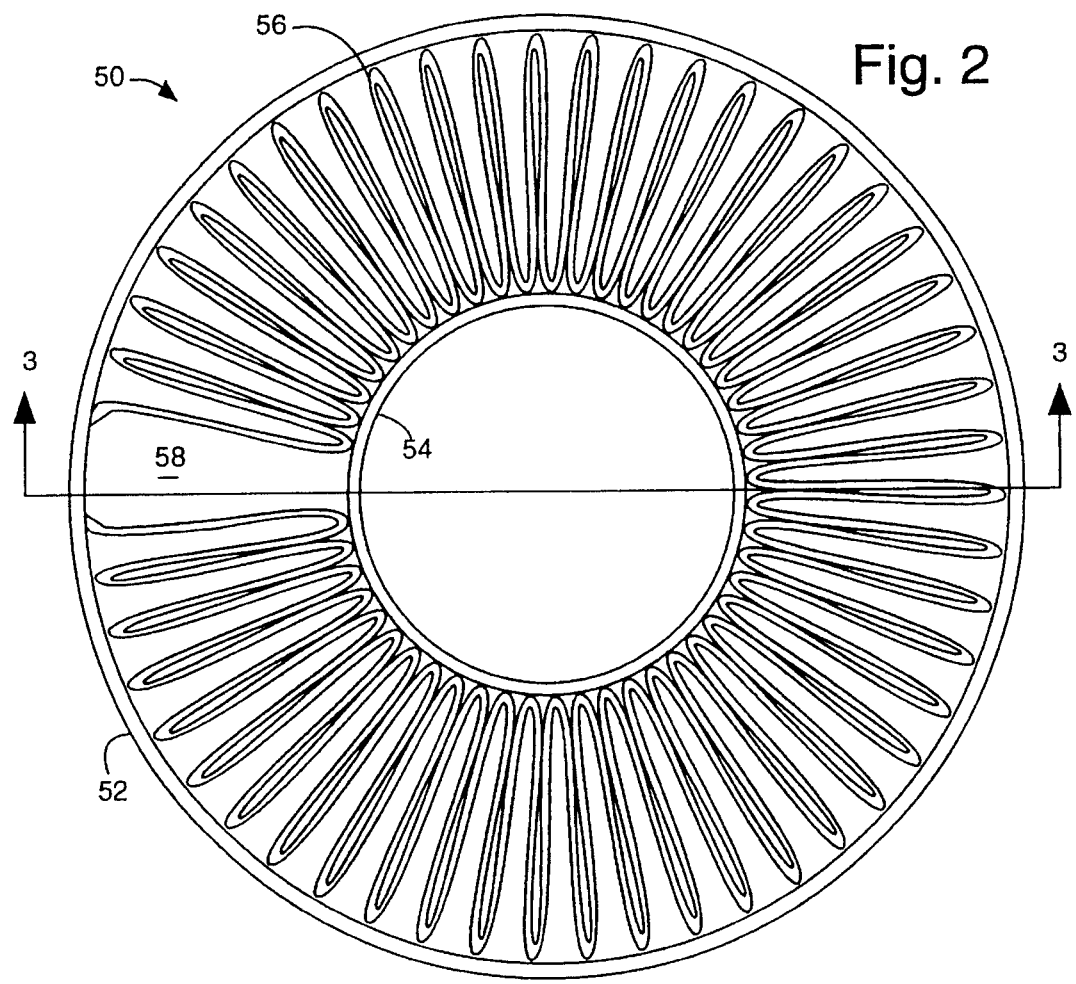
FIG. 2 is an end view typical of the heat sinks included in the system of FIG. 1.
Figure 3:
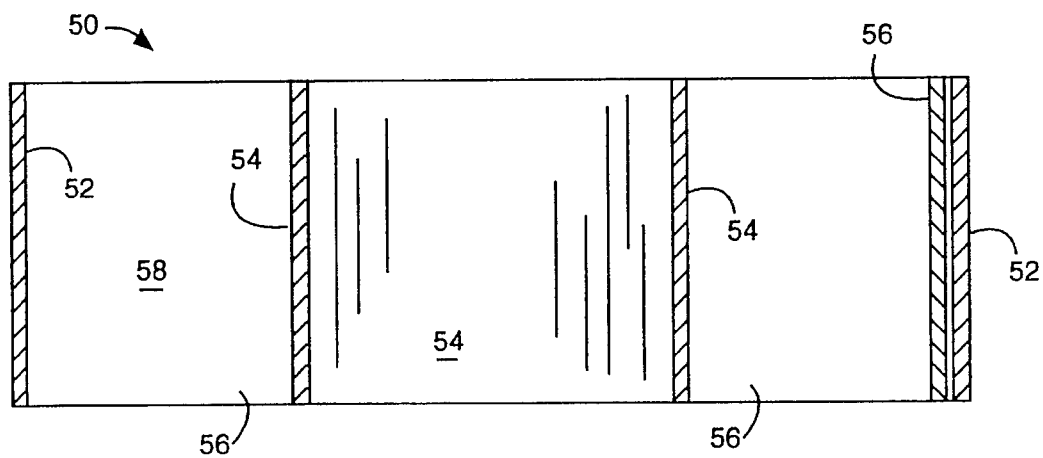
FIG. 3 is a cross-sectional view of the heat sink of FIG. 2 taken along the line 3—3.

FIGS. 2 and 3 show a heat sink 50, similar to heat sinks 18 and 20 of FIG. 1, which comprises an outer fin support 52, an inner fin support 54 and a pleated fin material 56. Preferably, the fin supports 52 and 54 and the fin material 56 comprise nickel-plated copper. The fin supports 52 and 54 are coaxial, circular cylindrical rings, and the fin material 56 is accordion-pleated into folds that are respectively cusil brazed at their outside and inside ends to the outer and inner fin supports 52 and 56. In one application, a device to be cooled, such as a thousand watt arc lamp in a projection system, is snug-fit within the inner fin support 54 and cooling air is forced through the fins formed by pleating the fin material 56. A gap 58 provides access for fasteners to secure the inner fin support 54 to the device to be cooled and/or access for electrical connections. In a typical arc lamp application, the inner fin support 54 has a nominal diameter of 2.590 inches and the outer fin support 52 has a nominal diameter of 3.718 inches. Both fin supports 52 and 54, in such a case, have a height of 1.200 inches and are 0.032 inch thick copper material.

The heat sink 50 is very efficient because it provides numerous cooling fins with very thin cross-sections. Preferably, the pleating of the fin material 56 produces as many as 130 total fins that are 0.012 inches thick, 0.500 inches along the axis of heat sink 50 and 1.20 inches in radial length between the fin supports 52 and 54. The gap 58 is preferably 0.400 inches wide.

Figure 4:
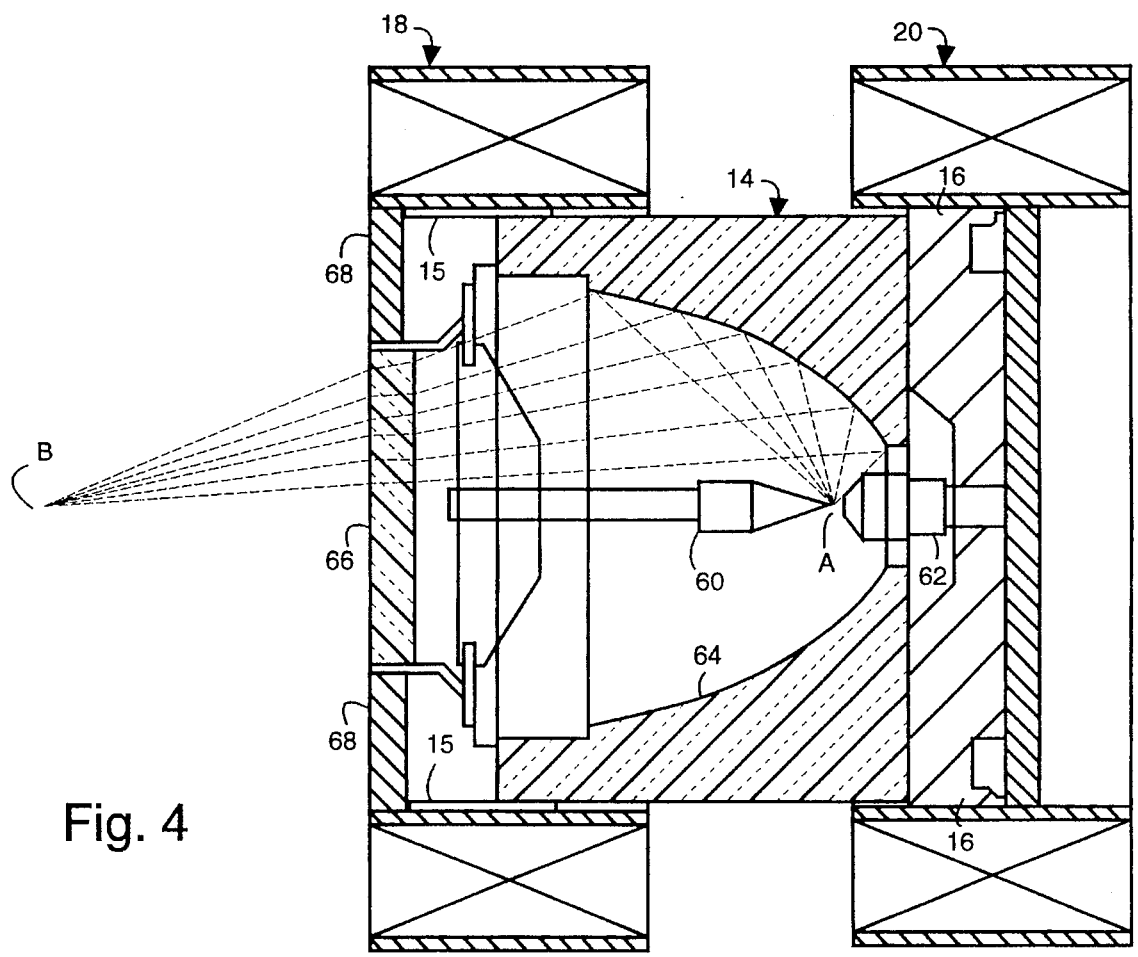
FIG. 4 is a cross-sectional diagram of the arc lamp included in the system of FIG. 1.

FIG. 4 shows the arc lamp 14 of FIG. 1 comprises a cathode electrode 60 and an anode electrode 62 that sustain an electric arc between them to produce light at a point "A". Light from point "A" is reflected by an elliptical reflector 64 through a window 66 to a point "B". Because the light from the arc lamp 14 is not output in a parallel beam, and is focused instead at the point "B", the diameter of the window 66 can be substantially smaller than the diameter of the arc lamp 14 itself. The high power levels of the arc lamp 14 necessitate the use of sapphire, or other expensive materials for the window 66. If the window 66 were the full width of the arc lamp 14, the outer perimeter of the window 66 would be wasted. In an arc lamp 14 with a diameter of two inches, the window 66 preferably has a diameter of one and three-eighths inches. The objective in window diameter reduction is to reduce the diameter of the window to no more than the point where substantial light output is throttled, given the optics of the reflector 64.

A substantial heat load is sustained by the window 66 as a result of the intense radiation passing through it from the point "A" and the heat conduction from the electrodes 60 and 62. Therefore, a copper heat conduction flange 68, e.g., a split retainer ring, is needed to conduct heat from the window 66 to the cathode heat sink 18. The copper heat conduction flange 68 is preferably brazed to the cathode heat sink 18.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A drop-in lamp assembly for docking in a receptacle box, comprising:

a cylindrical arc lamp with a cathode ring and an anode ring for electrical connection and heat conduction for cooling;

a cathode heat sink attached to said cathode ring for cooling the arc lamp during operation;

an anode heat sink attached to said anode ring for cooling the arc lamp during operation; and an insulative sleeve including a cylindrical through-hole within which are disposed the arc lamp, the cathode heat sink and the anode heat sink, and further including a pair of bushings which pierce a wall of the sleeve and provide for electrical connection to and mechanical retention of the arc lamp, the cathode heat sink and the anode heat sink and further provide for connection to a pair of terminals in which said insulative sleeve docks.

2. The assembly of claim 1, wherein:

the arc lamp includes an elliptical reflector and a window having a diameter substantially smaller that the diameter of the arc lamp itself, wherein window material is conserved and said window diameter is not so constricted as to throttle substantial light output from the arc lamp given the optical characteristics of said elliptical reflector.

3. The assembly of claim 1, wherein:

the arc lamp includes a window for passing through light output from the arc lamp and a metal heat conduction flange that surrounds the outside perimeter of said window and provides for the conduction of heat generated in the window to the cathode heat sink.

4. A receptacle box for docking a drop-in lamp assembly, comprising:

a metal box housing providing for docking of a drop-in insulative sleeve and arc lamp assembly, and including openings at opposite ends providing for a cooling air flow through a pair of cathode and anode heat sinks within said insulative sleeve;

a fan attached to the metal box housing providing for a forced-air flow through said holes and through the cathode and anode heat sinks for cooling of the arc lamp during operation; and an insulating board attached to the metal box providing for support of a pair of electrical terminals to contact the cathode and anode heat sinks through a pair of bushings in said insulative sleeve and to provide power to operate said drop-in insulative sleeve and arc lamp.

5. A lamp system, comprising:

a cylindrical arc lamp with a cathode ring and an anode ring for electrical connection and heat conduction for cooling;

a cathode heat sink attached to said cathode ring for cooling the arc lamp during operation;

an anode heat sink attached to said anode ring for cooling the arc lamp during operation;

an insulative sleeve including a cylindrical through-hole within which are disposed the arc lamp, the cathode heat sink and the anode heat sink, and further including a pair of bushings which pierce a wall of the sleeve and provide for electrical connection to and mechanical retention of the arc lamp, the cathode heat sink and the anode heat sink;

a metal box housing providing for docking of the insulative sleeve and including openings at opposite ends providing for a cooling air flow through the cathode and anode heat sinks;

a fan attached to the metal box housing providing for a forced-air flow through said holes and through the cathode and anode heat sinks for cooling of the arc lamp during operation; and an insulating board attached to the metal box providing for support of a pair of electrical terminals to contact the cathode and anode heat sinks and to provide power to operate the arc lamp.

6. The system of claim 5, wherein the cathode and anode heat sinks each comprise:

an inner fin support of metal formed in a cylindrical ring;

an outer fin support of metal formed in a cylindrical ring and coaxial with the inner fin support; and a metal fin material in a rectangular strip and accordion-pleated into folds and brazed to each of the inner and outer fin supports to form a plurality of fins parallel to an axis of both the inner and outer fin supports.

7. The system of claim 6, wherein:

the inner and outer fin supports comprise nickel plated copper material approximately 0.032 inches thick; and the metal fin material comprises nickel plated copper material approximately 0.012 inches thick.

8. The system of claim 6, wherein:

the metal fin material comprises as many as a hundred and thirty folds with a gap provided for access of fasteners and electrical connections.

9. The system of claim 5, wherein:

the arc lamp includes an elliptical reflector and a window having a diameter substantially smaller that the diameter of the arc lamp itself, wherein window material is conserved and said window diameter is not so constricted as to throttle substantial light output from the arc lamp given the optical characteristics of said elliptical reflector.

10. The system of claim 5, wherein:

the arc lamp includes a window for passing through light output from the arc lamp and a metal heat conduction flange that surrounds the outside perimeter of said window and provides for the conduction of heat generated in the window to the cathode heat sink.

11. The system of claim 5, wherein:

the arc lamp includes an elliptical reflector and a window of a transparent material having a diameter substantially smaller that the diameter of the arc lamp itself, wherein window material is conserved and said window diameter is not so constricted as to throttle substantial light output from the arc lamp given the optical characteristics of said elliptical reflector; and a metal heat conduction flange that surrounds the outside perimeter of said window and provides for the conduction of heat generated in the window to the cathode heat sink.

12. A modular packaged lamp assembly, comprising:

a cylindrical arc lamp with a cathode ring and an anode ring for electrical connection and heat conduction for cooling, an elliptical reflector and a window of transparent material having a diameter substantially smaller that the diameter of the arc lamp itself, wherein window material is conserved and said window diameter is not so constricted as to throttle substantial light output from the arc lamp given the optical characteristics of said elliptical reflector;

a cathode heat sink attached to said cathode ring, and having an inner fin support of metal formed in a cylindrical ring, an outer fin support of metal formed in a cylindrical ring and coaxial with the inner fin support, and a metal fin material in a rectangular strip and accordion-pleated into folds and brazed to each of the inner and outer fin supports to form a plurality of fins parallel to an axis of both the inner and outer fin supports;

an anode heat sink attached to said anode ring, and having an inner fin support of metal formed in a cylindrical ring, an outer fin support of metal formed in a cylindrical ring and coaxial with the inner fin support, and a metal fin material in a rectangular strip and accordion-pleated into folds and brazed to each of the inner and outer fin supports to form a plurality of fins parallel to an axis of both the inner and outer fin supports;

a metal box housing enclosing the arc lamp and attached cathode and anode heat sinks and including holes providing for air flow through the cathode and anode heat sinks;

a fan attached to the metal box housing providing for a forced-air flow through said holes and through the cathode and anode heat sinks for cooling of the arc lamp; and an insulating board attached to the metal box providing for support of a pair of electrical terminals to contact the cathode and anode heat sinks and to provide power to operate the arc lamp.

13. The assembly of claim 12, wherein:

the inner and outer fin supports comprise nickel plated copper material approximately 0.032 inches thick; and the metal fin material comprises nickel plated copper material approximately 0.012 inches thick and comprises as many as a hundred and thirty folds with a gap provided for access of fasteners and electrical connections.

14. The assembly of claim 12, further comprising:

a metal heat conduction flange that surrounds the outside perimeter of said window and provides for the conduction of heat generated in the window to the cathode heat sink.

* * * * *